United States Patent
Bushell et al.

(10) Patent No.: US 7,865,031 B2
(45) Date of Patent: Jan. 4, 2011

(54) METHOD AND SYSTEM FOR AUTOMATIC CORRECTION OF CHROMATIC ABERRATION

(75) Inventors: Steven Joseph Bushell, Cranston, RI (US); Bruce Allen Maxwell, Springfield, PA (US); Richard Mark Friedhoff, New York, NY (US)

(73) Assignee: Tandent Vision Science, Inc., San Francisco, CA (US)

( * ) Notice: Subject to any disclaimer, the term of this patent is extended or adjusted under 35 U.S.C. 154(b) by 1196 days.

(21) Appl. No.: 11/406,461

(22) Filed: Apr. 18, 2006

(65) Prior Publication Data

US 2007/0242897 A1      Oct. 18, 2007

(51) Int. Cl.
*G06K 9/40* (2006.01)
(52) U.S. Cl. ..................................... 382/274
(58) Field of Classification Search .................. 382/274
See application file for complete search history.

(56) References Cited

U.S. PATENT DOCUMENTS

| | | | |
|---|---|---|---|
| 3,785,733 A | 1/1974 | Bender | 355/77 |
| 4,500,916 A | 2/1985 | Nabulsi | 358/51 |
| 4,521,804 A | 6/1985 | Bendell | 358/51 |
| 4,733,296 A | 3/1988 | Honbo et al. | 358/51 |
| 4,980,760 A | 12/1990 | Hiratsuka et al. | 358/80 |
| 5,170,441 A | 12/1992 | Mimura et al. | 382/45 |

(Continued)

OTHER PUBLICATIONS

Boult, T.E.; Wolberg, G.; , "Correcting chromatic aberrations using image warping," Computer Vision and Pattern Recognition, 1992. Proceedings CVPR '92., 1992 IEEE Computer Society Conference on , vol., no., pp. 684-687, Jun. 15-18, 1992 doi: 10.1109/CVPR. 1992.223201 URL: http://ieeexplore.ieee.org/stamp/stamp.jsp?tp=&arnumber=223201&isnumber=5817.*

(Continued)

*Primary Examiner*—Bhavesh M Mehta
*Assistant Examiner*—Nirav G Patel
(74) *Attorney, Agent, or Firm*—Davidson, Davidson & Kappel, LLC; Felix L. D'Arienzo, Jr.

(57) ABSTRACT

In a first exemplary embodiment of the present invention, an automated, computerized method is provided for an automatic chromatic aberration correction. The method comprises the steps of setting a range of test correction factors, applying the test correction factors of the range, incrementally, to a test block of the image, measuring chromatic aberration error at the test block after application of each of the test correction factors, and selecting a test correction factor having a lowest chromatic aberration error.

36 Claims, 11 Drawing Sheets

U.S. PATENT DOCUMENTS

| | | | |
|---|---|---|---|
| 5,353,056 A | 10/1994 | Westerlink et al. | 348/263 |
| 5,475,428 A | 12/1995 | Hintz et al. | 348/263 |
| 5,742,410 A | 4/1998 | Suzuki | 358/518 |
| 6,002,434 A | 12/1999 | Topper | 348/263 |
| 6,263,100 B1 | 7/2001 | Oshino et al. | 382/154 |
| 6,323,934 B1 | 11/2001 | Enomoto | 355/40 |
| 6,587,224 B1 | 7/2003 | Nabeshima et al. | 358/1.9 |
| 6,603,885 B1* | 8/2003 | Enomoto | 382/263 |
| 6,697,522 B1 | 2/2004 | Ishikawa | 382/167 |
| 6,747,766 B1 | 6/2004 | Kamisuwa et al. | 358/505 |
| 6,801,334 B1 | 10/2004 | Enomoto | 358/1.18 |
| 6,853,400 B1 | 2/2005 | Matama | 348/96 |
| 6,870,564 B1 | 3/2005 | Burns | 348/263 |
| 2001/0033678 A1* | 10/2001 | Hirai | 382/128 |
| 2004/0247201 A1* | 12/2004 | Arazaki | 382/275 |
| 2005/0018175 A1* | 1/2005 | Cheng | 356/124 |
| 2006/0008141 A1 | 1/2006 | Lin et al. | 382/167 |

OTHER PUBLICATIONS

Reeves, C., ed. *Modern Heuristic Techniques for Combinatorial Problems.* New York: John Wiley and Sons, Inc., 1993 ISBN:0-470-22079-1, 16 pages.

Kirkpatrick, Gelatt, and Vecchi, "Optimization by Simulated Annealing," Science 220 (1983) 671-680.

Hooke & Jeeves, "Direct Search Solution of Numerical and Statistical Problems," Journal of the ACM, vol. 8, pp. 212-229, Apr. 1961.

* cited by examiner

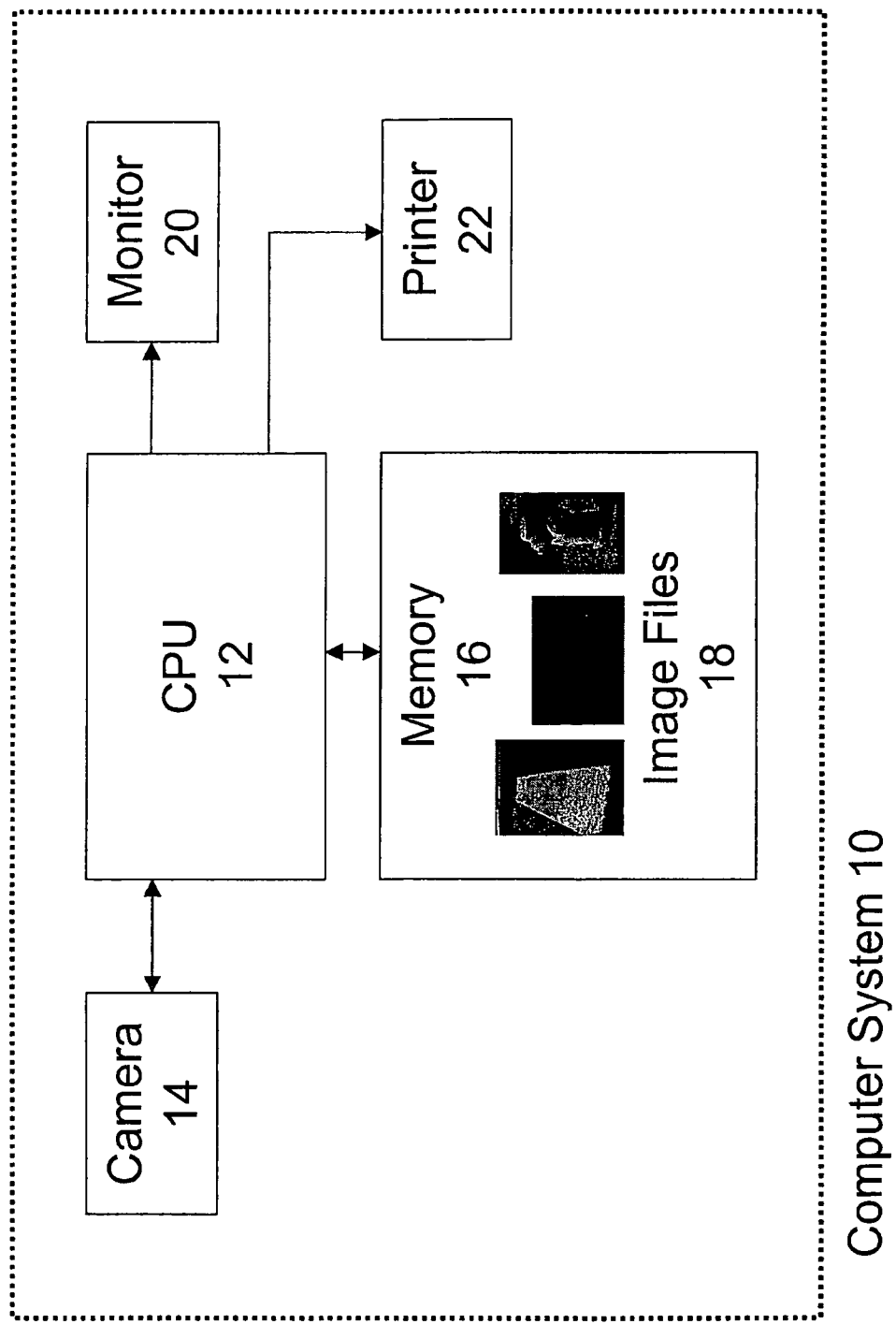
Figure 1: Computer System Configured to Operate on Images

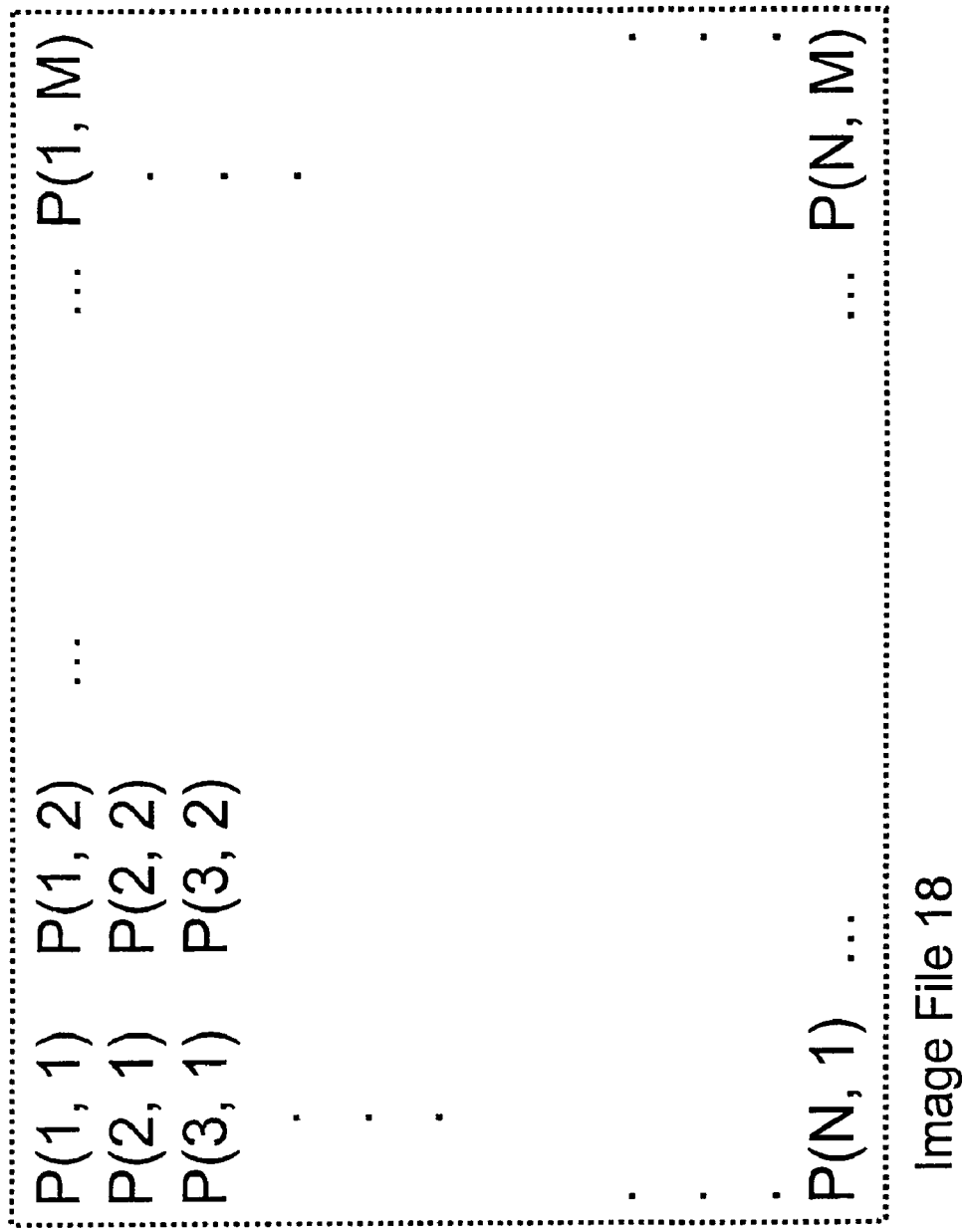
Figure 2: Pixel Array for Storing Image Data

Figure 3a: Normal Image - No Lateral Chromatic Aberration
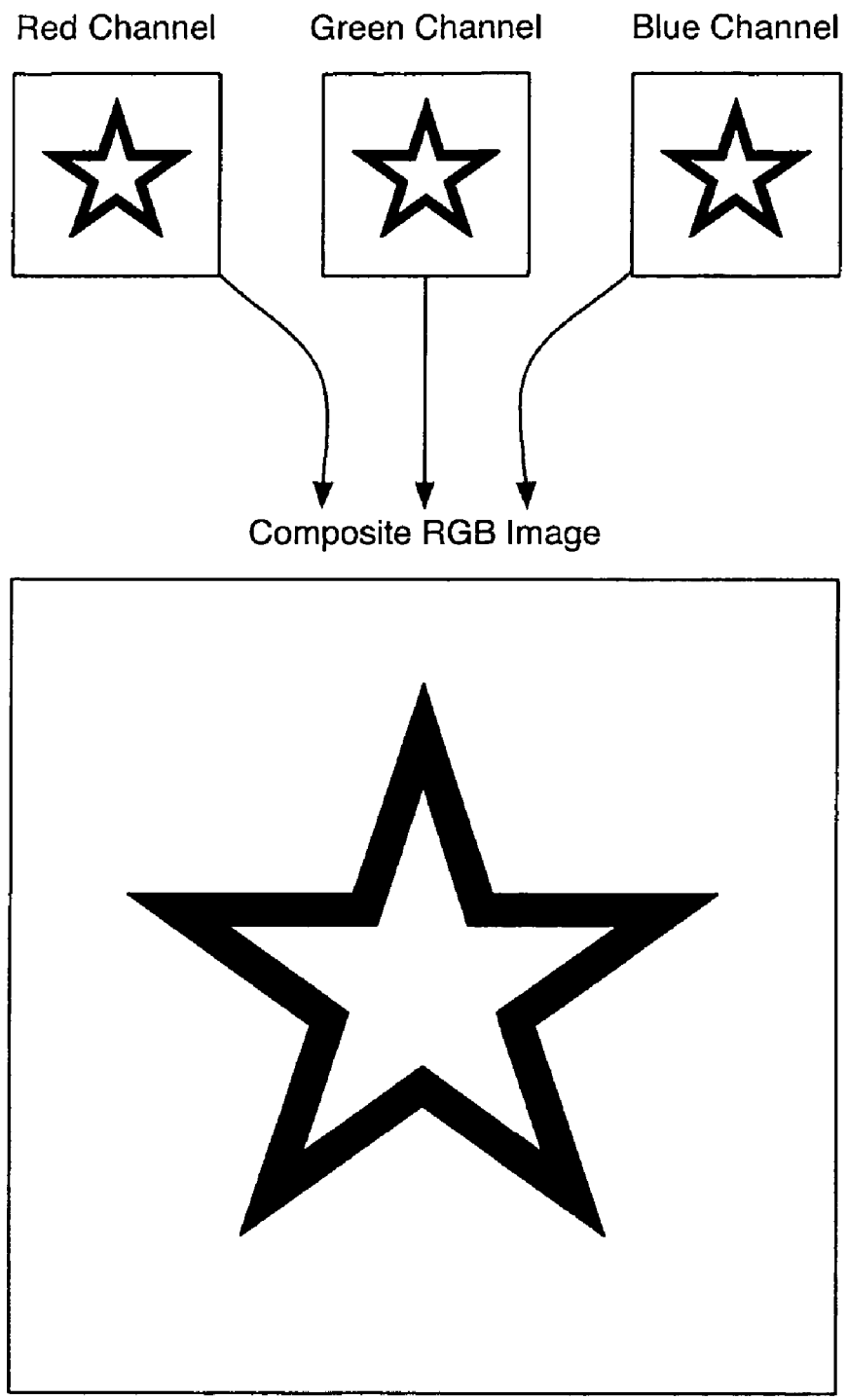
Normal image of black star on white background.
Edges are sharp and monochrome.

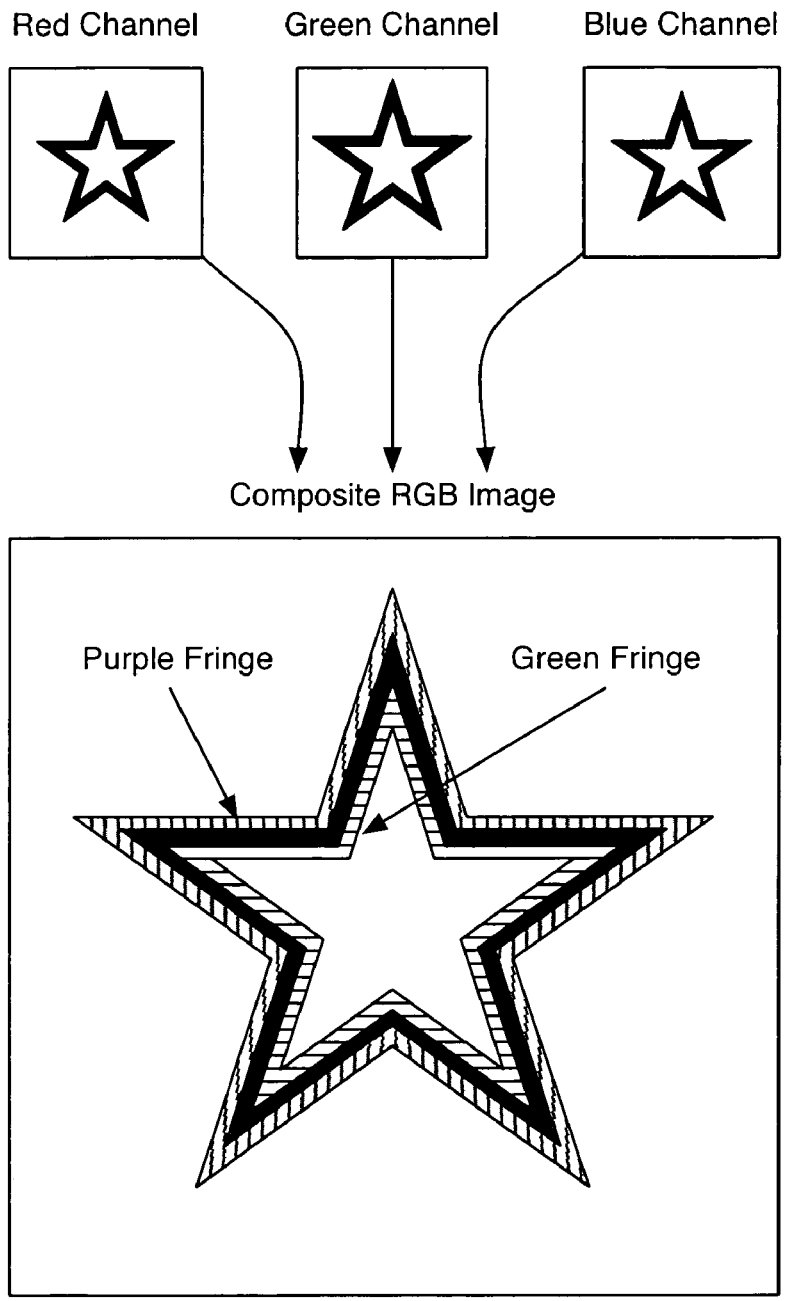
Figure 3b: Image With Lateral Chromatic Aberration
Green channel has a greater magnification
Image of black star on white background with typical lateral chromatic aberration present.
The green channel has a larger magnification compared to red and blue. As a result, edges are blurry and suffer from chromatic fringes.

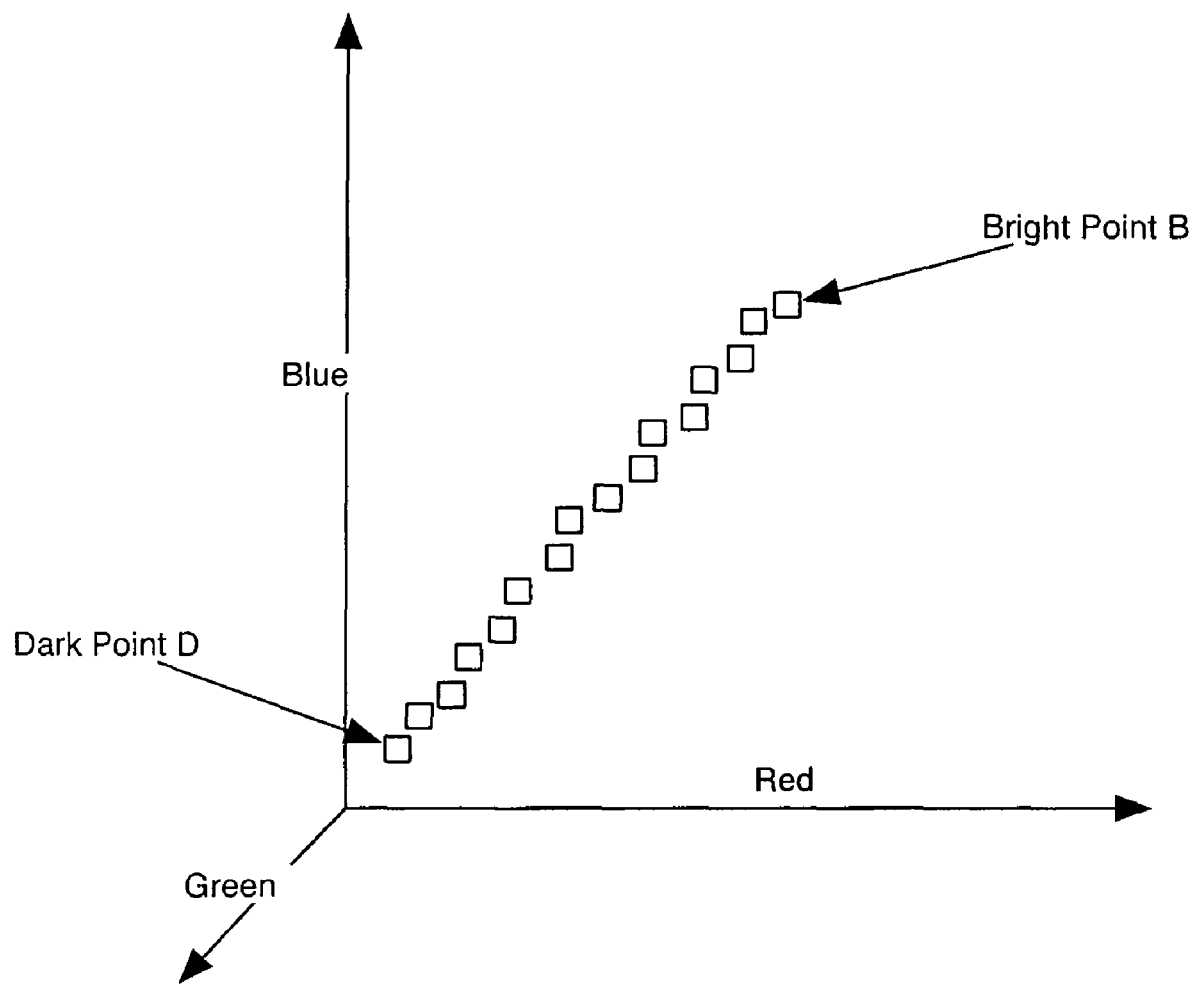
Figure 4: Ideal Bright/Dark Transitions in a Block of Pixels

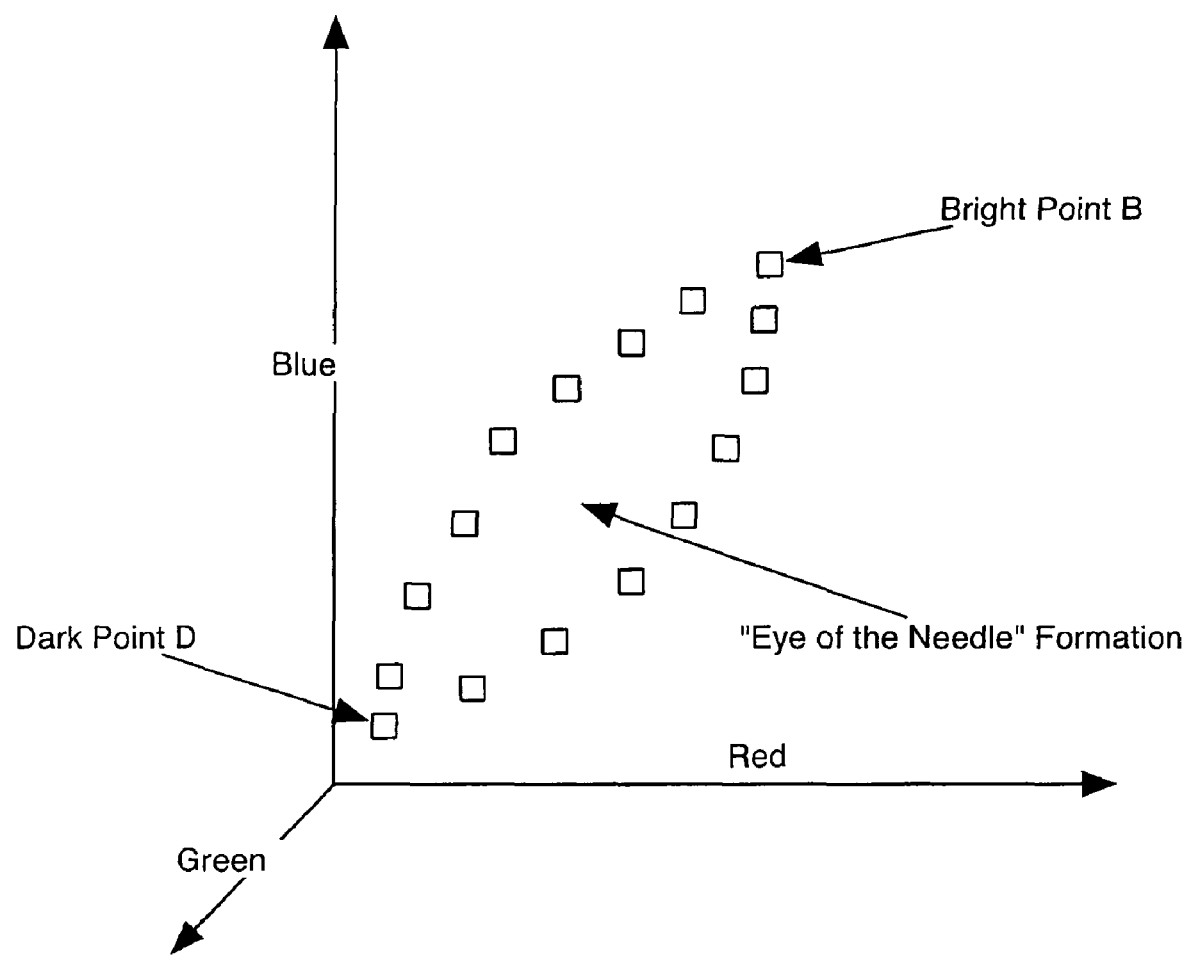
Figure 5: Bright/Dark Transitions in a Block of Pixels with Chromatic Aberrations Present

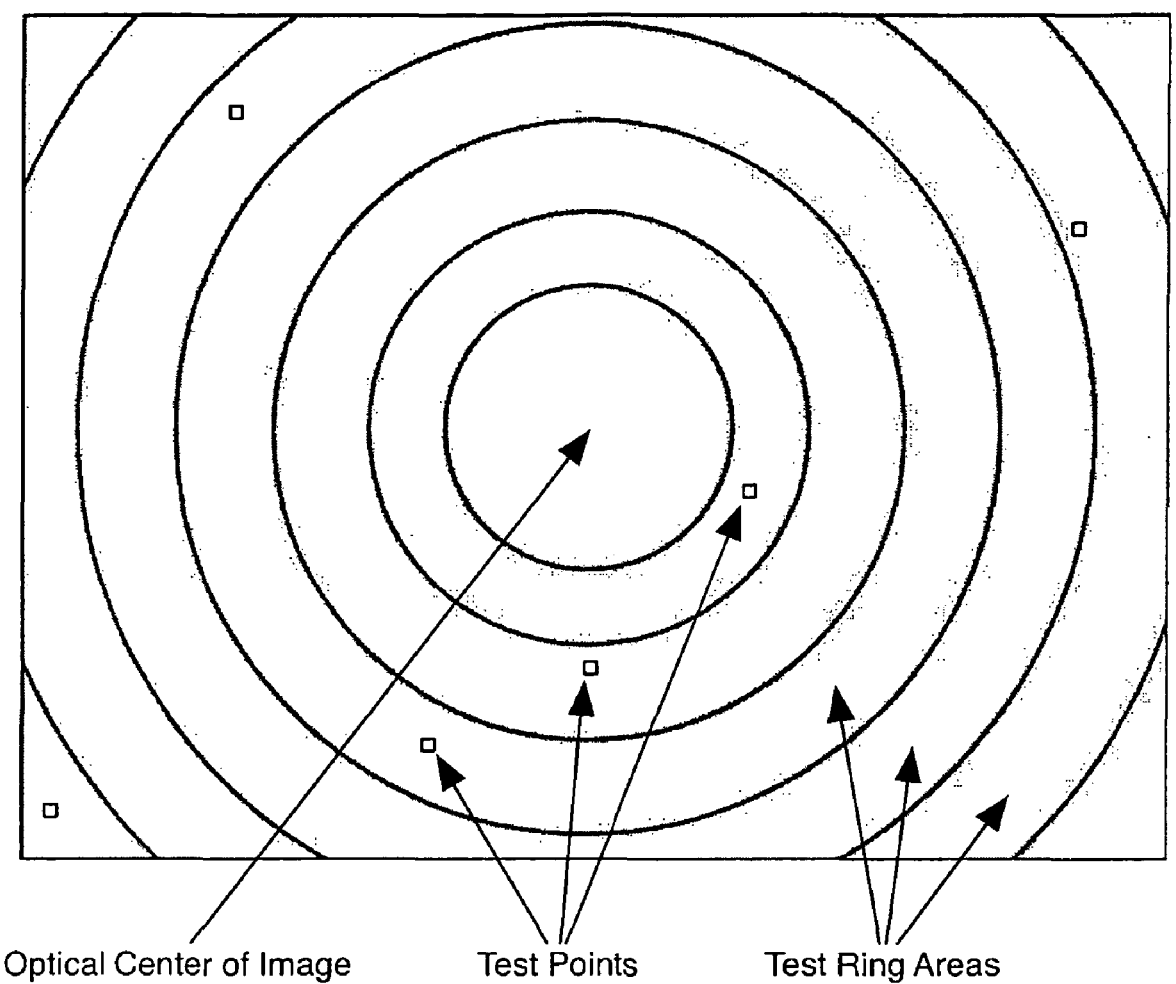
Figure 6: Sample Distribution of Test Rings and Test Points in an Image

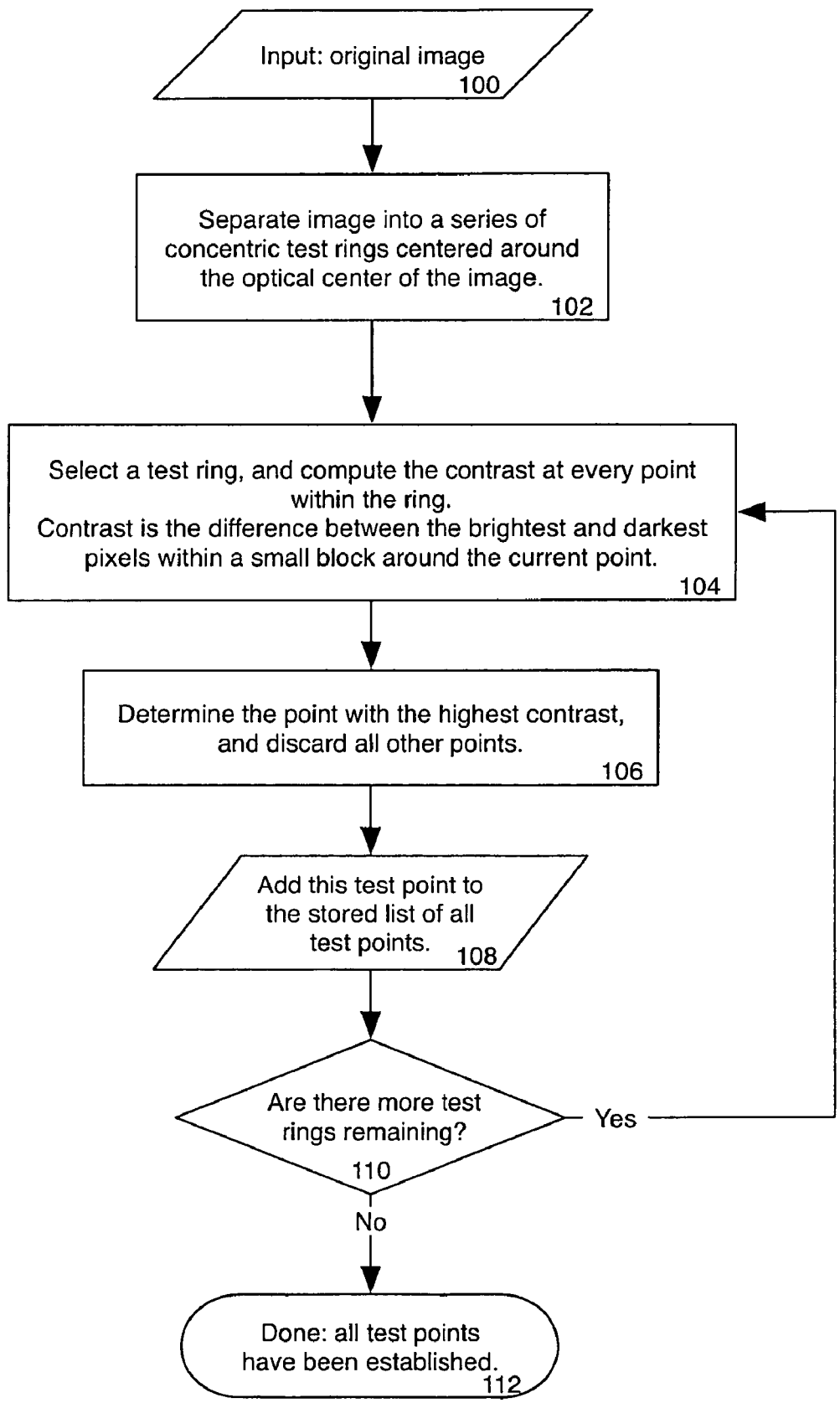
Figure 7: Determination of Test Points in the Image.

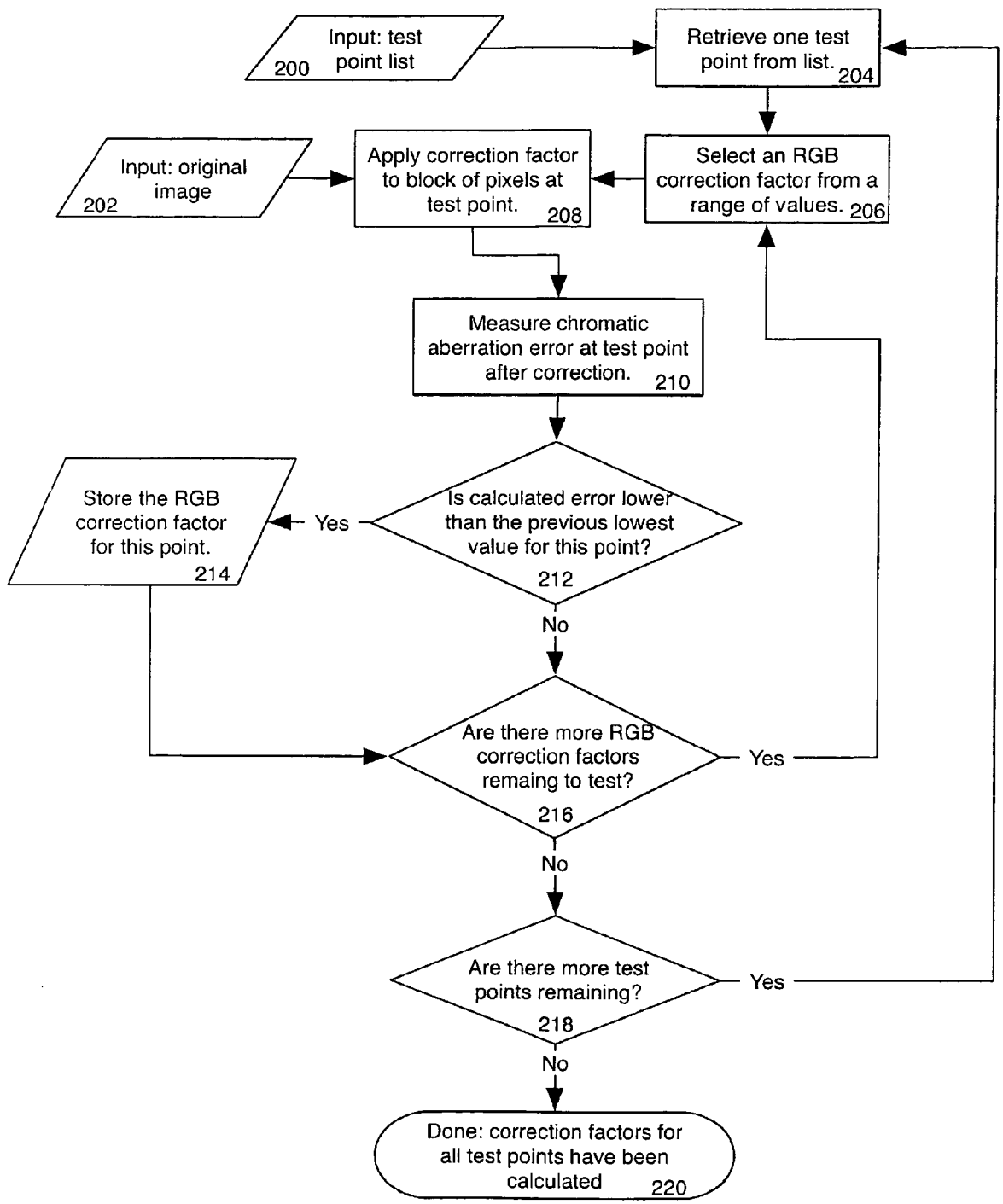
Figure 8: Calculation of Optimal Correction Factors.

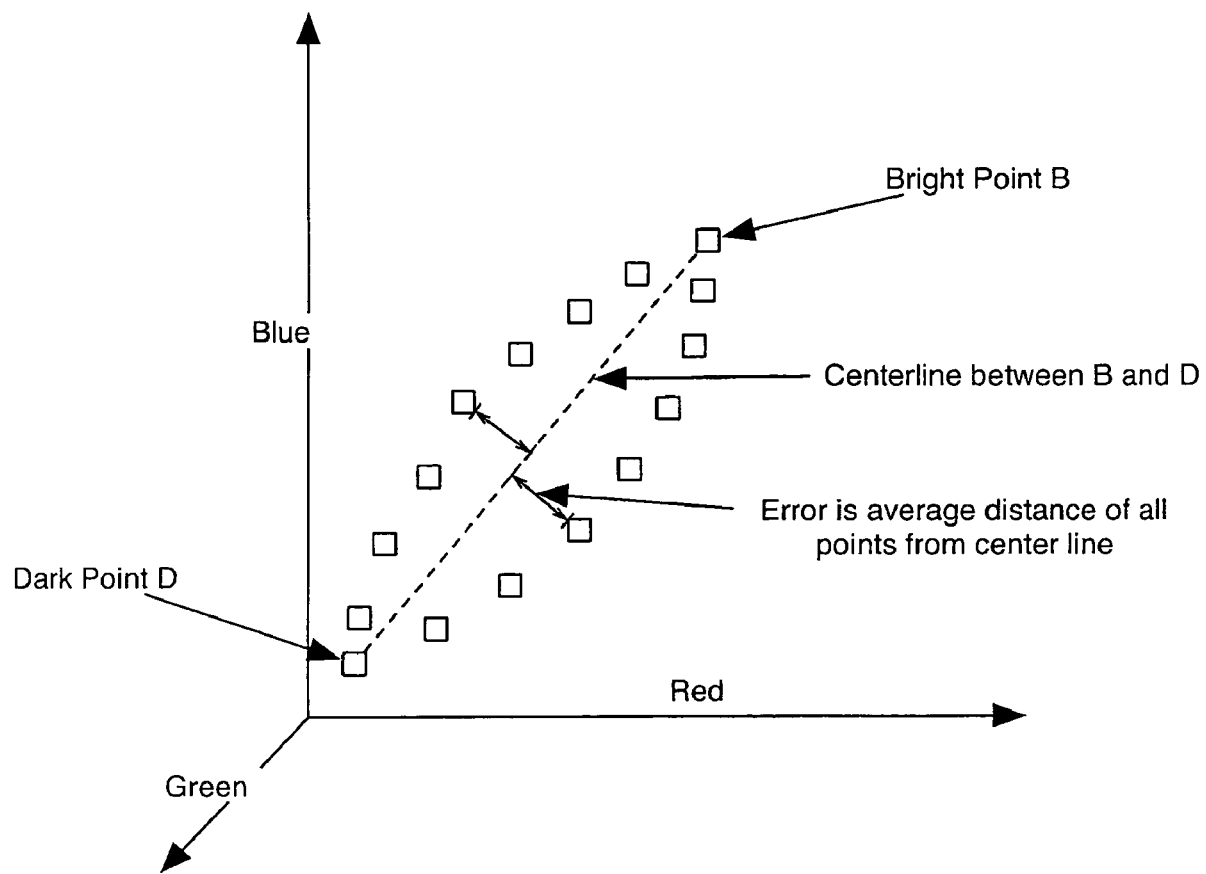
Figure 9: Quantification of Chromatic Aberration Error at a Test Point

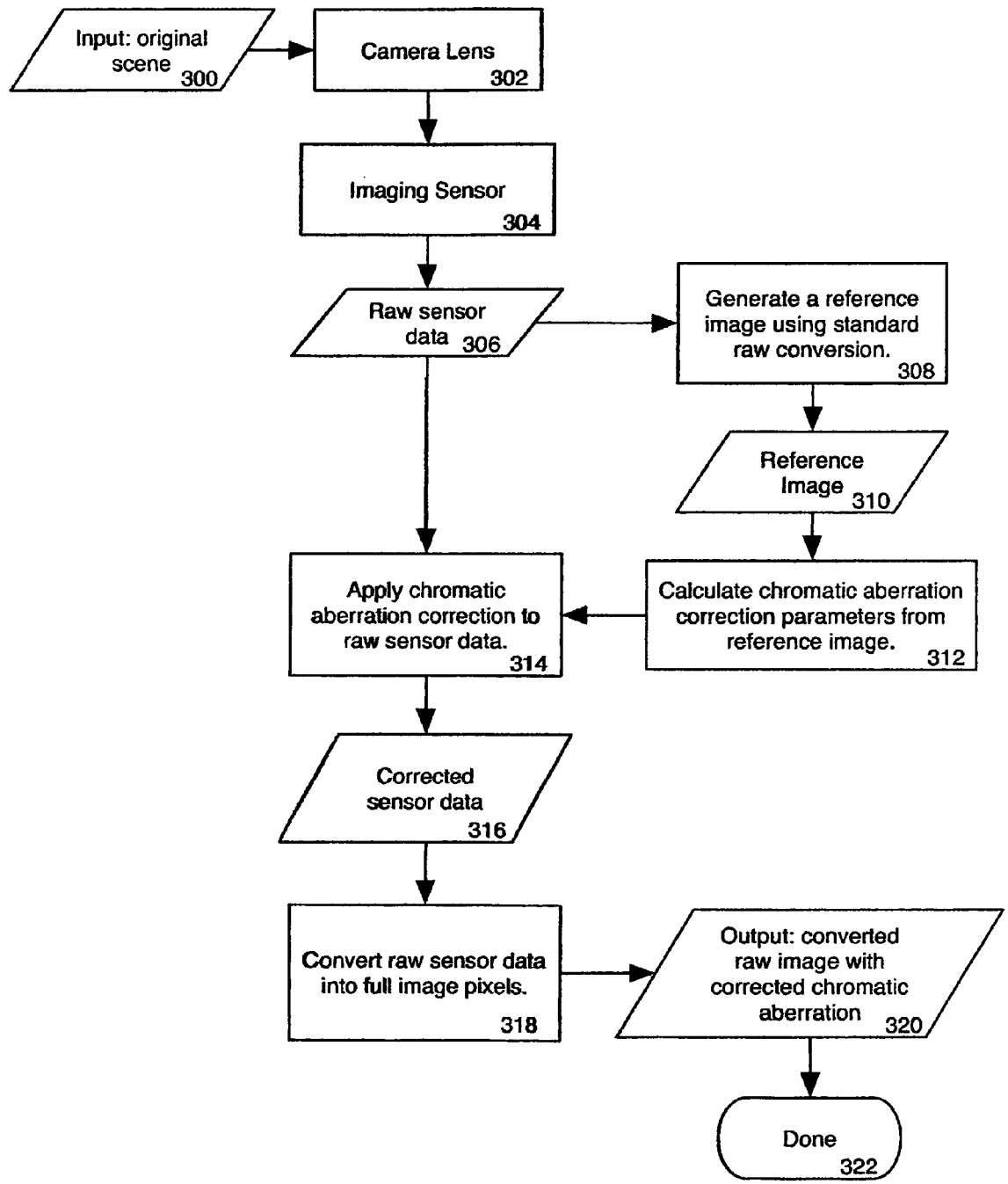
Figure 10: Application of Automatic Chromatic Aberration Correction During Raw Image Conversion.

METHOD AND SYSTEM FOR AUTOMATIC CORRECTION OF CHROMATIC ABERRATION

BACKGROUND OF THE INVENTION

Lateral chromatic aberration is a color artifact that degrades image sharpness and color quality. Lateral chromatic aberration is a phenomenon that occurs when a scene is imaged by an optical system. For example, a lens of an optical system refracts different wavelengths differently from one another. Under these circumstances, one color component of an object in the scene, is projected onto an electronic sensor at a different magnification than another color component of the object. The mismatch of magnification between the color components causes distortions such as fringes around the borders or boundaries of the depiction of the object in the image.

Inasmuch as chromatic aberration is caused by different wavelengths of light being projected at different magnifications, one proposal for the correction of the image degradation is to scale or adjust the image formed by each wavelength by a respective corrective magnification. For example, in digital photography, the wavelengths are grouped into three color channels, red, green and blue (RGB). Each of the separate color channels is spatially magnified by a correction factor until the aberrations are eliminated. In some commercially available digital editing applications a user is able to manually adjust channel magnifications until the resulting image is pleasing to the eye.

An automated method for calculating magnification correction factors utilizes a photograph of a known black and white grid. From the image projected from the grid, a comparison can be made to determine various shifts in the image resulting from channel magnifications. From the shift information, calculations of magnification factors can be executed and used to calibrate the optical system for correct image projection during future use. Some camera equipment, such as television camera implement an automatic chromatic aberration correction system that compares edge features in each of the color channels, and attempts to line up the edges using an error signal generated from the comparison.

SUMMARY OF THE INVENTION

The present invention provides a new and improved automatic chromatic aberration correction method and system.

In a first exemplary embodiment of the present invention, an automated, computerized method is provided for an automatic chromatic aberration correction. The method comprises the steps of setting a range of test correction factors, applying the test correction factors of the range, incrementally, to a test block of the image, measuring chromatic aberration error at the test block after application of each of the test correction factors, and selecting a test correction factor having a lowest chromatic aberration error.

In a second exemplary embodiment of the present invention, an automated, computerized method is provided for an automatic chromatic aberration correction. The method comprises the steps of setting a range of test correction factors, for each of the test correction factors of the range, applying the test correction factor to the image and plotting N band color channels for pixels of the image after application of a test correction factor from the range, in a color space, defining a reference line of the plot, measuring a chromatic aberration error as a function of pixel distance from the reference line; and selecting a test correction factor from the range having a lowest chromatic aberration error.

In a third exemplary embodiment of the present invention, an automated, computerized method for measuring chromatic aberration in an image is provided. The method comprises the steps of plotting N band color channels for pixels of the image in a color space, defining a reference line of the plot; and measuring a chromatic aberration error as a function of pixel distance from the reference line.

In a fourth exemplary embodiment of the present invention, a computer system comprises a CPU and a memory storing an image file. Pursuant to a feature of the present invention, the computer system is arranged and configured to execute a routine to set a range of test correction factors, apply the test correction factors of the range, incrementally, to a test block of the image file, measure chromatic aberration error at the test block after application of each of the test correction factors, and select a test correction factor having a lowest chromatic aberration error.

In a fifth exemplary embodiment of the present invention, a computer system comprises a CPU and a memory storing an image file. Pursuant to a feature of the present invention, the computer system is arranged and configured to execute a routine to set a range of test correction factors, for each of the test correction factors of the range, apply the test correction factor to the image file and plot N band color channels for pixels of the image file after application of a test correction factor from the range, in a color space, define a reference line of the plot, measure a chromatic aberration error as a function of pixel distance from the reference line and select a test correction factor from the range having a lowest chromatic aberration error.

In a sixth exemplary embodiment of the present invention, a computer system comprises a CPU and a memory storing an image file. Pursuant to a feature of the present invention, the computer system is arranged and configured to execute a routine to plot N band color channels for pixels of the image in a color space, define a reference line of the plot and measure a chromatic aberration error as a function of pixel distance from the reference line.

In a seventh exemplary embodiment of the present invention, an automated, computerized method for an automatic correction of chromatic aberration in an image, comprises the steps of providing a raw image from an image sensor, plotting N band color channels for pixels related to the raw image, in a color space, defining a reference line of the plot, measuring a chromatic aberration error as a function of pixel distance from the reference line, and generating a correction factor as a function of the measured chromatic aberration error, to correct chromatic aberration in the raw image. The raw image with corrected chromatic aberration can then be used to generate full image pixels.

In an eighth exemplary embodiment of the present invention, an optical device comprises a lens, an image sensor coupled to the lens, to generate a raw image and a CPU coupled to the image sensor. Pursuant to a feature of the present invention, the CPU is arranged and configured to execute a routine to plot N band color channels for pixels related to the raw image, in a color space, define a reference line of the plot, measure a chromatic aberration error as a function of pixel distance from the reference line, and generate a correction factor as a function of the measured chromatic aberration error, to correct chromatic aberration in the raw image. In this exemplary embodiment of the present invention, the optical device can comprise a camera.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programmed to carry out the steps of the methods of the present invention.

BRIEF DESCRIPTION OF THE DRAWINGS

FIG. 1 is a block diagram of a computer system arranged and configured to perform operations related to images.

FIG. 2 shows an n×m pixel array image file for an image stored in the computer system of FIG. 1.

FIG. 3a illustrates an example of an image.

FIG. 3b illustrates an example of an image with chromatic aberration.

FIG. 4 shows a graph in RGB space of a pixel array, aligned in an image without chromatic aberration.

FIG. 5 shows a graph in RGB space of a pixel array, misaligned in an image with chromatic aberration.

FIG. 6 illustrates an image arranged for sample test blocks according to a feature of the present invention.

FIG. 7 is a flow chart for selecting test blocks in an image according to a feature of the present invention.

FIG. 8 is a flow chart for determining a correction factor for chromatic aberration according to a feature of the present invention.

FIG. 9 illustrates measurement of chromatic aberration in an example of an image with chromatic aberration.

FIG. 10 is a flow chart for application of automatic chromatic aberration correction during raw image conversion.

DETAILED DESCRIPTION OF THE PREFERRED EMBODIMENTS

Referring now to the drawings and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations relating to images, for example, in connection with a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of N color bands or channels, for example, red, green and blue color components (RGB) of the picture element. The present invention is applicable to any multi-band image, where each band corresponds to a piece of the electro-magnetic spectrum. The pixel array includes m columns of n rows each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels (p(n, m, RGB)) in the image file 18, as is generally known.

In an image operation, the CPU 12 operates to analyze the N bands, for example the RGB color channel values of the pixels of a stored image file 18 to achieve various objectives, such as, for example, manipulation of the image to automatically correct chromatic aberration. As shown in FIG. 3a, when an image is properly recorded by a sensor, each of the color channels, in the example of FIG. 3a, Red, Green and Blue channels, align precisely with one another in a composite image, with the image exhibiting sharp edges at an object boundary. When the image is recorded with chromatic aberration, the Red, Green and Blue channels are recorded at different degrees of magnification. As shown in FIG. 3b, the differing degrees of magnification result in the composite image exhibiting blurry edges and chromatic fringes.

Most scenes depicted in an image file 18 interacted with an illumination flux having two illuminants, including a direct or incident illuminant and an ambient illuminant. The incident illuminant causes shadows. It is the ambient illuminant that is present within a shadow. The spectrum for the incident illuminant and the spectrum for the ambient illuminant are often different from one another.

According to a feature of the present invention, a useful characterization of the appearance of materials under two illuminants is derived from a bi-illuminant dichromatic reflection model (BIDR) of the image. The BIDR model indicates the appearance of a material surface that interacts with an illumination flux comprising an incident illuminant and an ambient illuminant having different spectra. For example, the BIDR model predicts that the color of a specific material surface is different in shadow than the color of that same surface when partially or fully lit, due to the differing spectra of the incident illuminant and the ambient illuminant. The BIDR model also predicts that the appearance of a single-color surface under all combinations of the two illuminants (from fully lit to full shadow) is represented by a line in a linear color space, such as, for example, an RGB color space, that is unique for the specific material and the illuminant combination interacting with the material. For a more detailed description of the BIDR model, reference should be made to co-pending application Ser. No. 11/341,751, filed Jan. 27, 2006, entitled: "Bi-illuminant Dichromatic Reflection Model For Image Manipulation," now published as US 2007/0176940 on Aug. 2, 2007, which is hereby incorporated by reference.

Thus, in an ideal recording of an image, as shown in FIG. 3a, a bright to dark transition in a block of pixels relating to, for example, a single material, from a fully lit portion to a fully shadowed portion of the material, forms a generally straight line of pixel values in a linear color space, such as an RGB color space, as clearly illustrated in FIG. 4. However, when an image is recorded with an optical system that causes a chromatic aberration, as shown in FIG. 3b, a transition from bright to dark results in an array of pixels in RGB space that form an "eye of the needle" formation, as shown in FIG. 5. According to a feature of the present invention, an automatic correction of chromatic aberration is achieved through an analysis of differences between a correct BIDR model linear representation of a dark to bright transition in an image and the "eye of the needle" formation caused by chromatic aberration.

To that end, a series of test blocks are selected in an image file 18 for use in an automatic correction analysis. As shown in FIG. 6, according to a feature of the present invention, the image file 18 is divided into a series of segments comprising, for example, concentric circles around the optical center of the image, and a test block is selected in each circle. FIG. 7 is a flow chart for selecting the test blocks as depicted in FIG. 6. In step 100, an image file 18 is accessed by the CPU 12, as an input to the routine. In step 102, the CPU 12 divides the image into the concentric circles shown in FIG. 6.

In step 104, the CPU 12 selects one of the concentric circles and computes the contrast between pixels within the selected circle. The step is carried out by sampling a series of blocks, each comprising an N×N block of pixels within the selected circle, and for each sample block, determining the difference between the brightest and darkest pixels of the block. N can be set at 4 pixels, to provide a 4×4 pixel mask (for a total of 16 pixels) within the current circle. The CPU 12 operates to traverse the entire area of the current concentric circle with the sample block as a mask.

In step 106, the CPU 12 determines the block (N×N block) of the current concentric circle with the highest contrast between bright and dark pixels, and in step 108, lists that test block as the test block for the current concentric circle. In determining the block with the highest contrast, the CPU 12 can determine whether the block contains pixels that are clipped at the bright end, and disregard that block or individual pixels of that block, if such a condition is ascertained. When a block having clipped bright pixels is disregarded, the CPU 12 selects a block having the next highest contrast between bright and dark pixels. In step 110, the CPU 12 enters a decision block to determine if there are additional concentric circles for computation of a test block. If yes, the CPU 12 returns to step 104, to select one of the remaining circles and repeats steps 104-110. If no, the CPU 12 outputs the list of test blocks (step 112).

FIG. 8 is a flow chart for automatically determining a correction factor for chromatic aberration, according to a feature of the present invention. The routine of FIG. 8 utilizes the test blocks listed by the CPU 12 during execution of the routine of the flow chart of FIG. 7, which is an input to the routine (step 200). The image file 18 for which test blocks have been selected, is also input to the CPU 12 (step 202). In step 204 the CPU 12 retrieves one of the test blocks from the test block list and in step 206, the CPU 12 selects a correction factor, for example, an RGB correction factor, from a range of correction factors.

According to a feature of the present invention, the range of correction factors focuses upon a range of relative magnification values for the various bands or color channels of the image, in our example, RGB values, to determine a set of relative values that will compensate for the chromatic aberration caused by an optical system. In a preferred embodiment of the present invention, the green channel is set at 1, and the red and blue channels are incrementally varied through selected values. A series of increments can begin in the red channel, with red set for a range of 1+M to 1−M, for example, M=0.002. The range can include S equal step values between 1+M and 1−M, for example, S=5. A similar series of steps can be set for the blue channel. The steps can be tested sequentially, varying the correction factor by the steps for the range of each of the red and blue channels.

In step 208, the CPU 12 corrects the pixels at the test block of the image by altering the relative magnification between the RGB channels, using the first correction factor selected from the range described above. In step 210, the chromatic aberration of the image is measured at the current test block of the image, after the correction. FIG. 9 illustrates measurement of chromatic aberration in an example of an image with chromatic aberration. As discussed above, the BIDR model predicts a linear relationship among pixels between a dark pixel and a bright pixel of a material. As also discussed, an "eye of the needle" formation, among the pixels in RGB space, results when chromatic aberration is present in the image. Thus, according to a feature of the present invention, the chromatic aberration at a test block of the image is measured by plotting the color channel bands of the image, in our example, RGB values of the current test block of the image, in an RGB space and setting a reference line comprising a centerline between, in our example, the dark and bright pixels of the plot. Other methods for finding an appropriate centerline can include the use of a primary eigenvector of the covariance matrix of the test block (a PVA analysis). Thereafter, a measure of error due to chromatic aberration is defined as the average distance of all intermediate pixel locations from the centerline, as shown in FIG. 9.

In a decision block (step 212), the CPU 12 determines whether the error calculated in step 210 is greater that a previous error for that test block. The previous error value can be initialized at an arbitrary high value before the initial correction of the current test block. If the error value is less than the previous error value, then the CPU 12 stores the current RGB correction factor as the correction factor for the test block (step 214), and proceeds to step 216. If the error value is greater than the previous error value, the CPU 12 proceeds directly to step 216.

In step 216, the CPU 12 determines whether there are more RGB correction factors from the range set up in step 206. If all of the values for red and blue range have been tested, the range can be reset around the correction factor having the lowest error value, within a range defined by reduced value of M, for example, $M_{new}=M_{old}/S$. This reduction of incremental step values around a best factor of a previous calculation can be repeated a number of times, for example 3 times, to refine the determination of a best correction factor. The method described regarding steps 206-216 comprises an iterative exhaustive search method. Any number of standard ID search algorithms can be implemented to search for a lowest error value. Such known search techniques include, for example, exhaustive search, univariate search, and simulated annealing search methods described in the literature. For example, the univariate search technique is described in Hooke & Jeeves, "Direct Search Solution of Numerical and Statistical Problems," Journal of the ACM, Vol. 8, pp 212-229, April, 1961. A paper describing simulated annealing is Kirkpatrick, Gelatt, and Vecchi, "Optimization by Simulated Annealing," Science 220 (1983) 671-680. Various other search techniques are described in Reeves, ed., Modern Heuristic Techniques for Combinatorial Problems, Wiley (1993).

If all correction factors have not been tested, the CPU 12 returns to step 206 to select another RGB correction factor and repeats steps 208-216. If all of the correction factors have been tested, the CPU proceeds to step 218.

In step 218, the CPU 12 determines whether there are any test blocks remaining for determination of an RGB correction factor. If yes, the CPU 12 returns to step 204 to select another test block, and repeats steps 206-218. If no, the CPU 12 proceeds to step 220 to output a correction factor for each test block.

According to a feature of the present invention, each of the correction factors can be used to correct the corresponding concentric circle of the image. Alternatively, it is possible to fit a single model to the magnification estimates of the concentric circles that maps each (x, y) image location of an image file 18 to a magnification factor m. For example, the CPU 12 could fit a 3rd order polynomial in radial distance r=sqrt(($C(x)-x)^2+(C(y)-y)^2$) (where $C(x)$ and $C(y)$ are locations of an optical center of the image depicted in the image file 18, along the x and y axes, respectively) to the magnification data, $$m=c1*r^3+c2*r^2+c3*r+c4.$$

In order to generate a single polynomial model, as represented by the coefficients {c1, c2, c3, c4} in the case of a 3*rd* order polynomial, to the magnification data, the CPU 12 sets up a set of simultaneous linear equations relating the radial distance of each concentric ring to its magnification estimate. The CPU 12 can then use known linear algebra techniques, such as singular value decomposition, to generate a least-squares estimate of the parameters of the polynomial model. Once the polynomial model is determined, the CPU 12 can use the polynomial to calculate the magnification factor for each pixel as a function of the pixel's radial distance from the center of the image. Using a single model that encompasses all of the magnification estimates results in a smoother and more pleasing correction of the image.

In accordance with a feature of the present invention, the automatic correction of chromatic aberration in an image can be implemented to correct a raw image recorded by, for example, an optical device such as a camera, prior to or during a conversion of the raw image to a standard file format, such as, for example, a TIFF or JPEG format. Thus, as noted above, the CPU 12, in an exemplary raw conversion embodiment, is implemented as a microprocessor embedded in the camera 14, and executes the routines of FIGS. 7 and 8 during operation of the camera 14 to convert and store the processed image in an image file within the camera, or as an image file 18, in the system of FIG. 1.

FIG. 10 is a flow chart for application of automatic chromatic aberration correction during a raw image conversion. The exemplary embodiment of FIG. 10 is implemented in an optical device such as, for example, a camera, but the core routine of FIG. 10 can be executed outside the camera or other optical device, as will be explained below. In this manner, a user can download a raw file from, for example, the camera 14 and execute a raw conversion with a computer system, such as the system 10 illustrated in FIG. 1. In step 300, illumination reflected from an object is focused by a camera lens (step 302) onto an imaging sensor in a camera, for example, the camera 14 of FIG. 1, as is well known (step 304). In step 306, an output of the imaging sensor is received by software modules executing on the CPU 12 (steps 308, 314).

As implemented in commercially available digital cameras, the output of the imaging sensor is a raw image. The raw image can include sensor values of pure red, green and blue values (RGB), in a common Bayer pattern sensor array such as:

G(1,1)B(2,1)G(3,1)
R(1,2)G(2,2)R(3,2)
G(1,3)B(2,3)G(3,3)

Wherein the numbers in parenthesis represent the column and row position of the particular color sensor in the array. These sensor positions can be expressed as RGB values:

RGB(X,G(1,1),X)RGB(X,X,B(2,1))RGB(X,G(3,1),X)
RGB(R(1,2),X,X)RGB(X,G(2,2),X)RGB(R(3,2),X,X)
RGB(X,G(1,3),X)RGB(X,X,B(2,3))RGB(X,G(3,3),X)

Where X, in each instance, represents a value yet to be determined. A raw conversion constructs a color value for each X value of a sensor location. A known, simplistic raw conversion calculates average values of adjacent sensor locations to reconstitute missing pixel values. For example, for the center sensor, x, y(2, 2), RGB((X, G(2, 2), X), the X values are computed as follows to generate a full pixel RGB value: RGB((R(1, 2)+R(3, 2))/2, G(2, 2), (B(2, 1)+B(2, 3))/2). The R value for X of the pixel is the average of the R's of sensors of adjacent columns to the G(2, 2) sensor, and the B value for X is the average of the adjacent rows of the G(2, 2) sensor.

In step 308, the CPU 12 executes a known raw conversion algorithm, for example, the traditional scheme, as just described, to generate a reference image. In step 310, the output of the reference image is input to a software module of the CPU 12, to execute the routines of FIGS. 7 and 8, as described above, on the reference image, to calculate the chromatic aberration correction parameters for the reference image.

In step 314, the raw image is received by the CPU 12, as noted above, as well as the chromatic aberration correction parameters for the reference image generated in step 312. The CPU 12 applies the correction parameters to the raw sensor data. For example, the CPU 12 can use a polynomial to calculate the magnification factor for each corresponding pixel of the reference image, as a function of the pixel's radial distance from the center of the reference image, as described above. The result provides corrected sensor data (step 316), which is then used by the CPU 12 to execute the known raw conversion algorithm to generate full image pixels (step 318). In step 320, the output comprises a converted raw image with corrected chromatic aberration, and the routine completes (step 322).

In the event that the camera 14 downloads raw files to the computer system 10, the CPU 12, as shown in FIG. 1 would execute steps 306 to 322 of the routine of FIG. 10, to generate the converted raw image with corrected chromatic aberration.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for an automatic correction of chromatic aberration in an image, comprising the steps of:
    a computer executing the following steps:
    setting a range of test correction factors;
    applying the test correction factors of the range, incrementally, to a test block of the image;
    measuring chromatic aberration error at the test block after application of each of the test correction factors by plotting N band color channels for pixels of the test block in a color space, defining a reference line between darkest and brightest pixels of the plot and measuring a chromatic aberration error as function of pixel distance from the reference line; and
    selecting a test correction factor having a lowest chromatic aberration error.

2. The method of claim 1 wherein the step of applying the test correction factors of the range, incrementally, to a test block of the image is carried out by repeating the step for each of a plurality of test blocks in the image and selecting a test correction factor having a lowest chromatic aberration error at each of the plurality of test blocks.

3. The method of claim 2 comprising the further step of identifying each of the plurality of test blocks by dividing the image into discrete segments and identifying a test block within each segment.

4. The method of claim 3 wherein each segment of the image comprises a concentric circle.

5. The method of claim 3 wherein the step of identifying a test block within the segment is carried out by determining a point having a highest dark/light contrast within the segment.

6. The method of claim 1 comprising the further step of applying the selected test correction factor to correct chromatic aberration in the image.

7. The method of claim 3 comprising the further step of applying each of the selected test correction factors to correct chromatic aberration in a corresponding segment of the image.

8. The method of claim 3 comprising the further step of utilizing the selected test correction factors to generate a model of the test block correction factors, to provide a correction factor model for the image for correcting chromatic aberration in the image.

9. The method of claim 8 wherein the model is generated as a function of a polynomial model algorithm.

10. An automated, computerized method for an automatic correction of chromatic aberration in an image, comprising the steps of:
a computer executing the following steps:
setting a range of test correction factors;
for each of the test correction factors of the range, applying the test correction factor to the image and plotting N band color channels for pixels of the image after application of a test correction factor from the range, in a color space;
defining a reference line of the plot;
measuring a chromatic aberration error as a function of pixel distance from the reference line; and
selecting a test correction factor from the range having a lowest chromatic aberration error.

11. The method of claim 10 wherein the N bands comprise RGB color values.

12. The method of claim 10 wherein the reference line is a centerline between a bright pixel and a dark pixel of the plot.

13. The method of claim 10 wherein the step of plotting N band color channels for pixels of the image in a color space is carried out by plotting pixels of a test block of the image.

14. The method of claim 10 wherein the range of test correction factors is set by fixing a number of incremental steps between relative values for the N bands.

15. The method of claim 10, wherein the range of test correction factors is set by fixing a number of incremental steps between relative values for the N bands, and further comprising the further steps of after selecting a test correction factor from the range having a lowest chromatic aberration error, resetting the range of test correction factors around the correction factor having the lowest chromatic aberration error, and repeating the steps of claim 11 for the reset range of test correction factors.

16. An automated, computerized method for measuring chromatic aberration in an image, comprising the steps of:
a computer executing the following steps:
plotting N band color channels for pixels of the image in a color space;
defining a reference line of the plot, the reference line is a centerline between a brightest pixel and a darkest pixel of the plot of the pixels; and
measuring a chromatic aberration error as a function of pixel distance from the reference line.

17. An automated, computerized method for measuring chromatic aberration in an image, comprising the steps of:
a computer executing the following steps:
plotting N band color channels for pixels of the image in a color space;
defining a reference line of the plot, the reference line comprises a primary eigenvector of a covariance matrix of the pixels; and
measuring a chromatic aberration error as a function of pixel distance from the reference line.

18. A computer system which comprises:
a CPU; and
a memory storing an image file;
the CPU arranged and configured to execute a routine to set a range of test correction factors, apply the test correction factors of the range, incrementally, to a test block of the image file, measure chromatic aberration error at the test block after application of each of the test correction factors by plotting N band color channels for pixels of the test block in a color space, defining a reference line between darkest and brightest pixels of the plot and measuring a chromatic aberration error as function of pixel distance from the reference line, and
select a test correction factor having a lowest chromatic aberration error.

19. A computer system which comprises:
a CPU; and
a memory storing an image file;
the CPU arranged and configured to execute a routine to set a range of test correction factors, for each of the test correction factors of the range, apply the test correction factor to the image file and plot N band color channels for pixels of the image file after application of a test correction factor from the range, in a color space, define a reference line of the plot, measure a chromatic aberration error as a function of pixel distance from the reference line and select a test correction factor from the range having a lowest chromatic aberration error.

20. A computer system which comprises:
a CPU; and
a memory storing an image file;
the CPU arranged and configured to execute a routine to plot N band color channels for pixels of the image in a color space, define a reference line of the plot, the reference line being defined by a centerline between a brightest pixel and a darkest pixel of the plot of the pixels, and measure a chromatic aberration error as a function of pixel distance from the reference line.

21. The method of claim 5 comprising the further step of ascertaining whether the block having a highest dark/light contrast within the segment, contains pixels that are clipped at a bright end, and disregarding one of that block and individual pixels of that block, if such a condition is ascertained.

22. An automated, computerized method for an automatic correction of chromatic aberration in an image, comprising the steps of:
a computer executing the following steps:
providing a raw image from an image sensor;
plotting N band color channels for pixels related to the raw image, in a color space;
defining a reference line of the plot, the reference line being defined by a centerline between a brightest pixel and a darkest pixel of the plot of the pixels;
measuring a chromatic aberration error as a function of pixel distance from the reference line; and
generating a correction factor as a function of the measured chromatic aberration error,
to correct chromatic aberration in the raw image.

23. An automated, computerized method for an automatic correction of chromatic aberration in an image, comprising the steps of:
a computer executing the following steps:
providing a raw image from an image sensor;
plotting N band color channels for pixels related to the raw image, in a color space;
defining a reference line of the plot;
measuring a chromatic aberration error as a function of pixel distance from the reference line;
generating a correction factor as a function of the measured chromatic aberration error, to correct chromatic aberration in the raw image; and
using the raw image with corrected chromatic aberration, to generate full image pixels.

24. An automated, computerized method for an automatic correction of chromatic aberration in an image, comprising the steps of:
a computer executing the following steps:
providing a raw image from an image sensor;
plotting N band color channels for pixels related to the raw image, in a color space;
defining a reference line of the plot, the pixels related to the raw image comprising pixels of a reference image generated as a function of the raw image;
measuring a chromatic aberration error as a function of pixel distance from the reference line; and
generating a correction factor as a function of the measured chromatic aberration error,
to correct chromatic aberration in the raw image.

25. A computer system which comprises:
a CPU; and
a memory storing an image file as a raw image;
the CPU arranged and configured to execute a routine to plot N band color channels for pixels related to the raw image, in a color space, define a reference line of the plot, the reference line being defined by a centerline between a brightest pixel and a darkest pixel of the plot of the pixels, measure a chromatic aberration error as a function of pixel distance from the reference line, and generate a correction factor as a function of the measured chromatic aberration error, to correct chromatic aberration in the raw image.

26. An optical device comprising:
a lens;
an image sensor coupled to the lens, to generate a raw image; and
a CPU coupled to the image sensor;
the CPU arranged and configured to execute a routine to plot N band color channels for pixels related to the raw image, in a color space, define a reference line of the plot, the reference line being defined by a centerline between a brightest pixel and a darkest pixel of the plot of the pixels, measure a chromatic aberration error as a function of pixel distance from the reference line, and generate a correction factor as a function of the measured chromatic aberration error, to correct chromatic aberration in the raw image.

27. The optical device of claim 26, wherein the optical device comprises a camera.

28. An automated, computerized method for measuring chromatic aberration in an image, comprising the steps of:
a computer executing the following steps:
plotting N band color channels for pixels of the image in a color space;
defining a reference line of the plot, the reference line being defined by a centerline between a brightest pixel and a darkest pixel of the plot of the pixels;
measuring a chromatic aberration error as a function of pixel distance from the reference line; and
generating a correction factor as a function of the measured chromatic aberration error,
to correct chromatic aberration in the image.

29. An optical device comprising:
a lens;
an image sensor coupled to the lens, to generate an image; and
a CPU coupled to the image sensor;
the CPU arranged and configured to execute a routine to plot N band color channels for pixels related to the image, in a color space, define a reference line of the plot, the reference line being defined by a centerline between a brightest pixel and a darkest pixel of the plot of the pixels,
measure a chromatic aberration error as a function of pixel distance from the reference line, and generate a correction factor as a function of the measured chromatic aberration error, to correct chromatic aberration in the image.

30. The optical device of claim 29, wherein the optical device comprises a camera.

31. A computer program product, disposed on a non-transitory computer readable media, the product including computer executable process steps operable to control a computer to:
provide an image file depicting an image, in a computer memory;
set a range of test correction factors;
apply the test correction factors of the range, incrementally, to a test block of the image;
measure chromatic aberration error at the test block after application of each of the test correction factors by plotting N band color channels for pixels of the test block in a color space, defining a reference line between darkest and brightest pixels of the plot and measuring a chromatic aberration error as function of pixel distance from the reference line; and
select a test correction factor having a lowest chromatic aberration error.

32. A computer program product, disposed on a non-transitory computer readable media, the product including computer executable process steps operable to control a computer to:
provide an image file depicting an image, in a computer memory;
set a range of test correction factors;
for each of the test correction factors of the range, apply the test correction factor to the image and plot N band color channels for pixels of the image after application of a test correction factor from the range, in a color space;
define a reference line of the plot;
measure a chromatic aberration error as a function of pixel distance from the reference line; and
select a test correction factor from the range having a lowest chromatic aberration error.

33. A computer program product, disposed on a non-transitory computer readable media, the product including computer executable process steps operable to control a computer to:
provide an image file depicting an image, in a computer memory;
plot N band color channels for pixels of the image in a color space;

define a reference line of the plot, the reference line being defined by a centerline between a brightest pixel and a darkest pixel of the plot of the pixels; and measure a chromatic aberration error as a function of pixel distance from the reference line.

34. A computer program product, disposed on a non-transitory computer readable media, the product including computer executable process steps operable to control a computer to:

provide an image file depicting a raw image, in a computer memory;

plot N band color channels for pixels related to the raw image, in a color space;

define a reference line of the plot, the reference line being defined by a centerline between a brightest pixel and a darkest pixel of the plot of the pixels;

measure a chromatic aberration error as a function of pixel distance from the reference line; and generate a correction factor as a function of the measured chromatic aberration error, to correct chromatic aberration in the raw image.

35. A computer program product, disposed on a non-transitory computer readable media, the product including computer executable process steps operable to control a computer to:

provide an image file depicting an image, in a computer memory;

plot N band color channels for pixels of the image in a color space;

define a reference line of the plot, the reference line being defined by a centerline between a brightest pixel and a darkest pixel of the plot of the pixels;

measure a chromatic aberration error as a function of pixel distance from the reference line; and generate a correction factor as a function of the measured chromatic aberration error, to correct chromatic aberration in the image.

36. A computer program product, disposed on a non-transitory computer readable media, the product including computer executable process steps operable to control a computer to:

provide an image file depicting an image, in a computer memory;

plot N band color channels for pixels of the image in a color space;

define a reference line of the plot, the reference line comprising a primary eigenvector of a covariance matrix of the pixels; and measure a chromatic aberration error as a function of pixel distance from the reference line.

\* \* \* \* \*